US 6,624,808 B1

(12) United States Patent
Andrews

(10) Patent No.: US 6,624,808 B1
(45) Date of Patent: Sep. 23, 2003

(54) SENSOR SYSTEM MOUSE

(75) Inventor: Cris Andrews, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/302,906

(22) Filed: Apr. 30, 1999

(51) Int. Cl.⁷ .............................................. G09G 5/08
(52) U.S. Cl. ...................................... 345/163; 345/166
(58) Field of Search ......................... 345/156, 163–166, 345/157, 158, 173–179; 382/313–315; 178/18.09, 18.04

(56) References Cited

U.S. PATENT DOCUMENTS

| | | | |
|---|---|---|---|
| 4,581,761 A | * | 4/1986 | Ichinokawa et al. ........ 345/163 |
| 5,202,950 A | | 4/1993 | Arego et al. |
| 5,390,276 A | | 2/1995 | Tai et al. |
| 5,459,489 A | | 10/1995 | Redford |
| 5,608,837 A | | 3/1997 | Tai et al. |
| 5,678,334 A | | 10/1997 | Schoniger |
| 5,684,354 A | | 11/1997 | Gleckman |
| 5,686,942 A | * | 11/1997 | Ball ............................ 345/158 |
| 5,706,028 A | * | 1/1998 | Murakami et al. .......... 345/163 |
| 5,717,168 A | * | 2/1998 | DeBuisser et al. ............. 178/18 |
| 5,726,684 A | | 3/1998 | Blackenship et al. |
| 5,774,063 A | | 6/1998 | Berry et al. |
| 5,831,697 A | | 11/1998 | Evanicky et al. |
| 5,835,173 A | | 11/1998 | Inbar et al. |
| 5,854,872 A | | 12/1998 | Tai |
| 5,861,969 A | | 1/1999 | Yasuda |
| 5,952,999 A | * | 9/1999 | Makinwa ..................... 345/173 |
| 6,020,849 A | * | 2/2000 | Fukuzaki ..................... 345/158 |
| 6,028,595 A | * | 2/2000 | Shiga ......................... 345/173 |
| 6,184,863 B1 | * | 2/2001 | Sibert et al. ................. 345/156 |
| 6,208,330 B1 | * | 3/2001 | Hasegawa et al. .......... 345/173 |
| 6,212,296 B1 | * | 4/2001 | Stork et al. ............... 178/19.01 |
| 6,215,901 B1 | * | 4/2001 | Schwartz | |

FOREIGN PATENT DOCUMENTS

| | | | |
|---|---|---|---|
| DE | 4031600 | * 3/1992 | .................. 345/163 |
| EP | 0505126 | * 9/1992 | .................. 345/163 |
| EP | 0775967 | * 5/1997 | .................. 345/163 |
| JP | 3-22016 | * 1/1991 | .................. 345/163 |

OTHER PUBLICATIONS

"Cableless System Mouse", IBM (Technical Disclosure Bulletin) vol. 28, No. 2, Feb. 1985.*

* cited by examiner

*Primary Examiner*—Regina Liang
(74) *Attorney, Agent, or Firm*—Trop, Pruner & Hu, P.C.

(57) ABSTRACT

The invention includes a pointer system that utilizes a plurality of sensors rather than a conventional roller ball system to determine movements of the pointer system. One component of the sensor system includes a sensor or sensors that emit signals which a second sensor component receives. The pointer system includes a hand unit, e.g., a mouse, incorporating one sensor component and a movement surface, e.g., a mouse pad, with a plurality of sensors which may be attached to the corners of the movement surface. If the hand unit is electrically coupled to the computer system, then each of the movement surface sensors may send a distinct signal which is received by the sensor of the hand unit. However, if the movement surface is electrically coupled to the computer system, then the hand unit sensor may emit a signal that is received by each of the sensors of the movement surface. Triangulation techniques may be used to determine the movement of the hand unit based on the signals received by the receiving sensor or sensors.

45 Claims, 4 Drawing Sheets

SENSOR SYSTEM MOUSE

BACKGROUND

The invention relates generally to pointer systems for computer systems, and more particularly to pointer systems that include a sensor system.

Several different types of devices have been used in pointer systems for computer displays. Common pointer systems include trackballs, light pens, and mice. A conventional mouse includes a roller ball that rotates as the mouse moves on a mouse pad. Rollers within a mouse aid in translating a ball's movement into delta X and Y coordinates. These coordinates are relayed to a computer system and interpreted by a software routine (a driver), resulting in the desired movement of a pointer on a computer display.

Another type of pointer device is an optical mouse which includes optical sensors on the bottom of the mouse to detect the movement of the mouse. Optical mice utilize a special mouse pad surface with a specific pattern to identify movement of a mouse. The mouse pad used with an optical mouse is merely a reflective component.

One problem with a conventional roller ball mouse may be that a ball generally picks up dirt, dust, and other particles from a mouse pad that become impediments to the proper movement of a mouse. These impediments may impair the movement of a roller ball and the other mechanical parts inside a mouse. Removing the impediments frequently involves user intervention. The user manually removes a roller ball from a mouse and cleans both the roller ball and the rollers incorporated in the mouse. Additionally, a roller ball mouse may include several mechanical parts to translate ball rotation into indications of linear movement. These additional mechanical parts may increase the cost of manufacturing as well as the probability of failure of a pointer system.

Thus, it would be beneficial to provide a mechanism for pointer system functions without the use of a conventional roller ball in a mouse.

SUMMARY

The invention includes a pointer system that utilizes a sensor system to determine movements of the pointer system. The pointer system includes a hand unit incorporating one sensor component operatively coupled to a movement surface with a plurality of sensors.

In one embodiment, the hand unit may be electrically coupled to the computer system. Each of the plurality of sensors attached to a movement surface may emit a distinct signal to be received by the sensor component of a hand unit.

In another embodiment, the movement surface may be electrically coupled to the computer system. The sensor component of a hand unit may emit a signal to be received by each of the plurality of sensors attached to a movement surface.

DETAILED DESCRIPTION

Techniques (including methods and devices) are described to construct a pointer system that utilizes a sensor system in a hand unit, e.g., a mouse, and a movement surface, e.g., a mouse pad, to respond to pointer system movements. The following embodiments of this invention are illustrative only and are not to be considered limiting in any respect.

Figure 1:
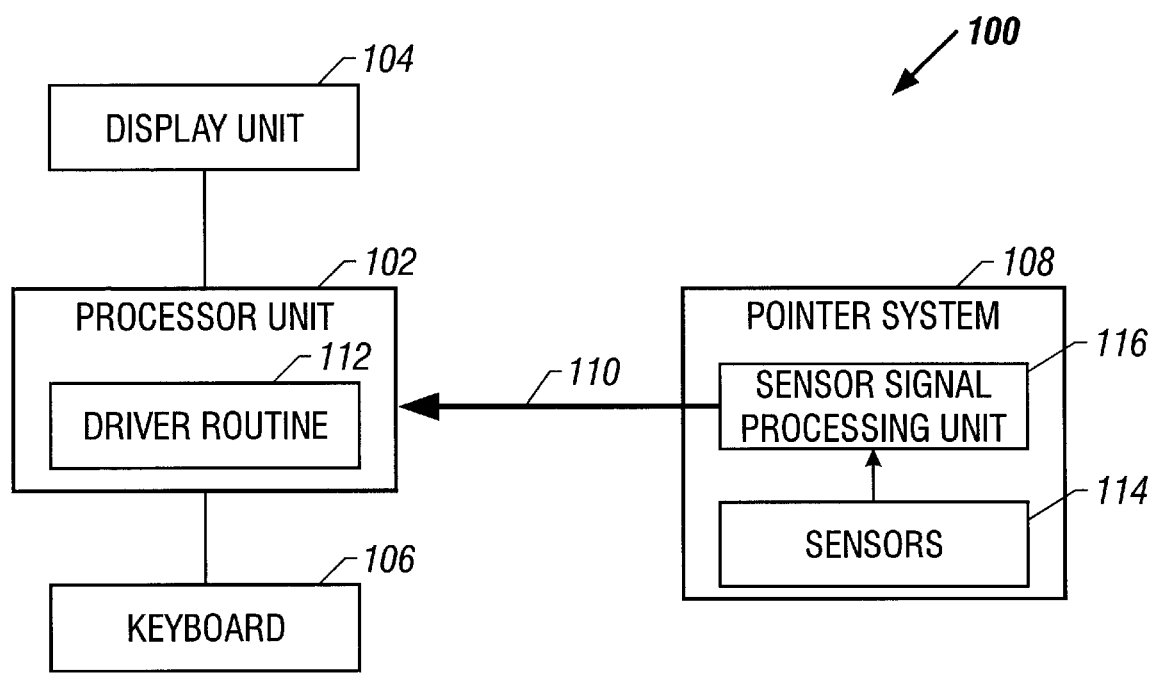
FIG. 1 shows an illustrative computer system with a pointer system.

Referring to FIG. 1, one embodiment of an illustrative computer system 100 may contain a processor unit 102 that may display data on a display unit 104. A processor unit 102 may also allow input from a keyboard 106. In addition, processor unit 102 may allow input from a pointer system 108 through a communication link 110. An illustrative communication link 110 may utilize cable or wireless technologies such as infrared (IR) or radio frequency (RF). A driver routine 112 may provide an interface between the processor unit 102 and the pointer system 108.

Figure 2:
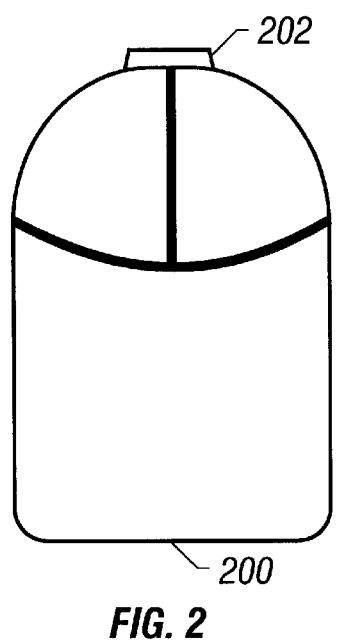
FIG. 2 shows a top view of a mouse in accordance with an embodiment of the invention.
Figure 3:
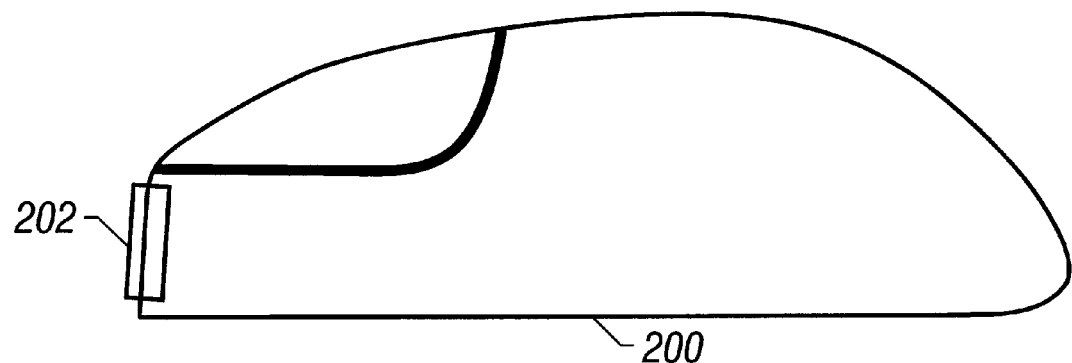
FIG. 3 shows a side view of a mouse in accordance with an embodiment of the invention.
Figure 4:
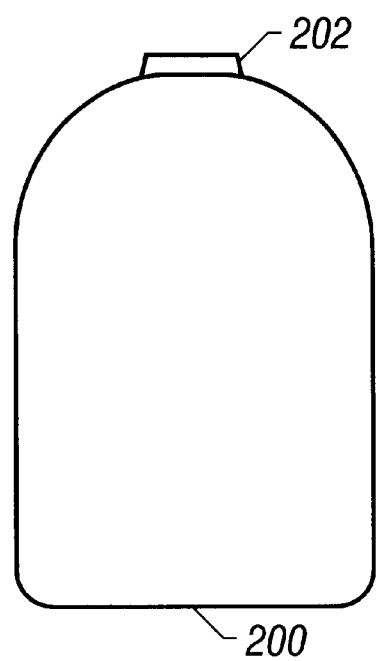
FIG. 4 shows a bottom view of a mouse in accordance with an embodiment of the invention.

A pointer system 108 in accordance with one embodiment of the invention may include a mouse incorporating one component of a sensor system to track the movement of the mouse. This arrangement is to be contrasted with a conventional pointer system that includes a roller ball system. Referring to FIGS. 2, 3, and 4, a mouse 200 is shown in top, side, and bottom views respectively. A sensor 202 may be located on the front end of a mouse 200 just below the conventional placement of mouse buttons in order to minimize obstruction of signals emitted by or received by the sensor 202. In another embodiment, sensor 202 may be incorporated within the case of a mouse 200.

A sensor system for use in a pointer system in accordance with the invention may include two components. One component includes a sensor or sensors that emit signals which a second sensor component receives. In this manner, one sensor component may be a transmitter adapted to transmit signals. The second sensor component may also include a plurality of sensors and may be a receiver adapted to receive signals from the transmitter component. The sensor components may be complementary such that the sensor component of a hand unit and the sensors of a movement surface work in concert to determine movements of a pointer system. For example, a first sensor component associated with a movement surface may emit an ultrasonic signal which a second (complementary) sensor component in a hand unit may receive. An embodiment of a sensor system used in a pointer system may utilize ultrasonic, magnetic, or electrostatic sensor technologies. Ultrasonic sensors may provide the most accurate data due to their range capacity.

Figure 5:
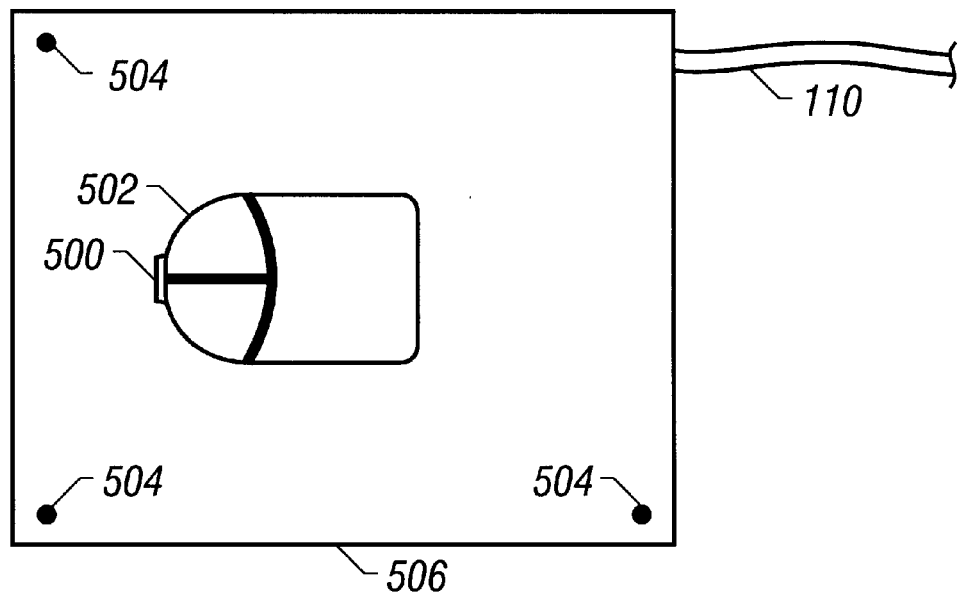
FIG. 5 shows a pointer system in accordance with one embodiment of the invention.

One embodiment, illustrated in FIG. 5, may include a sensor 500 located in a mouse 502. Sensor 500 may emit a signal detected by a plurality of sensors 504 which may be located at the corners of a mouse pad 506. The sensor system may utilize a signal received by sensors 504 in determining the movement of mouse 502. Again referring to FIG. 1, in this embodiment a communication link 110, e.g. a cable, may be attached to mouse pad 506 and may serve as the communication link between the sensors 504 and a driver routine 112 in processor unit 102.

Figure 6:
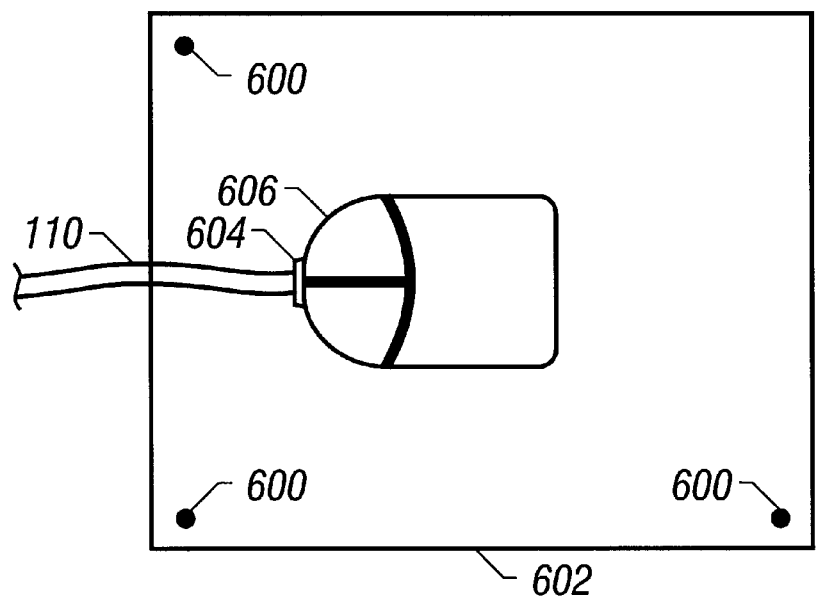
FIG. 6 shows a pointer system in accordance with an embodiment of the invention.

Another embodiment, illustrated in FIG. 6, may include a plurality of sensors 600 that may be coupled to a mouse pad 602 at fixed points at the corners of mouse pad 602. Each sensor 600 may emit a distinct signal to be detected by a sensor 604 located in a mouse 606. The sensor system may utilize the separate signals received by sensor 604 in determining movement of mouse 606. In this embodiment, referring again to FIG. 1, a communication link 110, e.g. a cable, may be attached to mouse 606 and may facilitate the transfer of data from sensor 604 to a driver routine 112 in processor unit 102.

Regardless of the configuration of the sensor system, the calculation of delta X and Y coordinates may be performed by a sensor signal processor unit 116 that is incorporated in a pointer system 108 or the sensor data signals may be transmitted to a processor unit 102 with the necessary calculations being performed by a pointer system driver routine 112. In accordance with one embodiment of the invention, a sensor signal processor unit 116 may use triangulation techniques to determine the location of a mouse based on signals received from sensors 114 associated with a movement surface. The sensor signal processing unit 116 may subsequently transmit an indication of the delta movement coordinates to a driver routine 112 located in processor unit 102 via communication link 110. In this embodiment, driver routine 112 may be a standard pointer system driver routine such as the Programming System 2 (PS/2) or Universal Serial Bus (USB) driver.

In another embodiment of the invention, sensor signal processor unit 116 may transmit signals directly to a driver routine 112 that is located in a processor unit 102 via a communication link 110. In this embodiment, a special driver routine may be provided to perform the calculations as well as executing all of the usual tasks of a pointer system driver routine. A driver routine 112 for this embodiment may perform the following functions in a polling loop. First, a driver routine 112 may receive raw signal data from a pointer system 108 and calculate the current position of the mouse. Next, delta X and Y coordinates may be calculated based on the previous location of the mouse. These delta coordinates may then be sent to the routine responsible for updating a computer display. Finally, the driver routine 112 may store the new coordinates of the mouse, and then continue at the beginning of the polling loop by receiving more signal data from pointer system 108.

The signals received by a sensor may be acousto-optical, magnetic, or electrostatic. These signals provide an indication of the distance between a hand unit and a particular sensor coupled to the movement surface. By using sensor signals to determine the change in location of a hand unit, the delta movements in X and Y directions may be calculated (e.g. triangulation techniques). Further, by determining the change in hand unit position over time, an indication of the hand unit's speed of motion may be generated. The technique used to actually calculate the location and movement of a mouse may depend upon the number and location of fixed sensors on a mouse pad.

Figure 7:
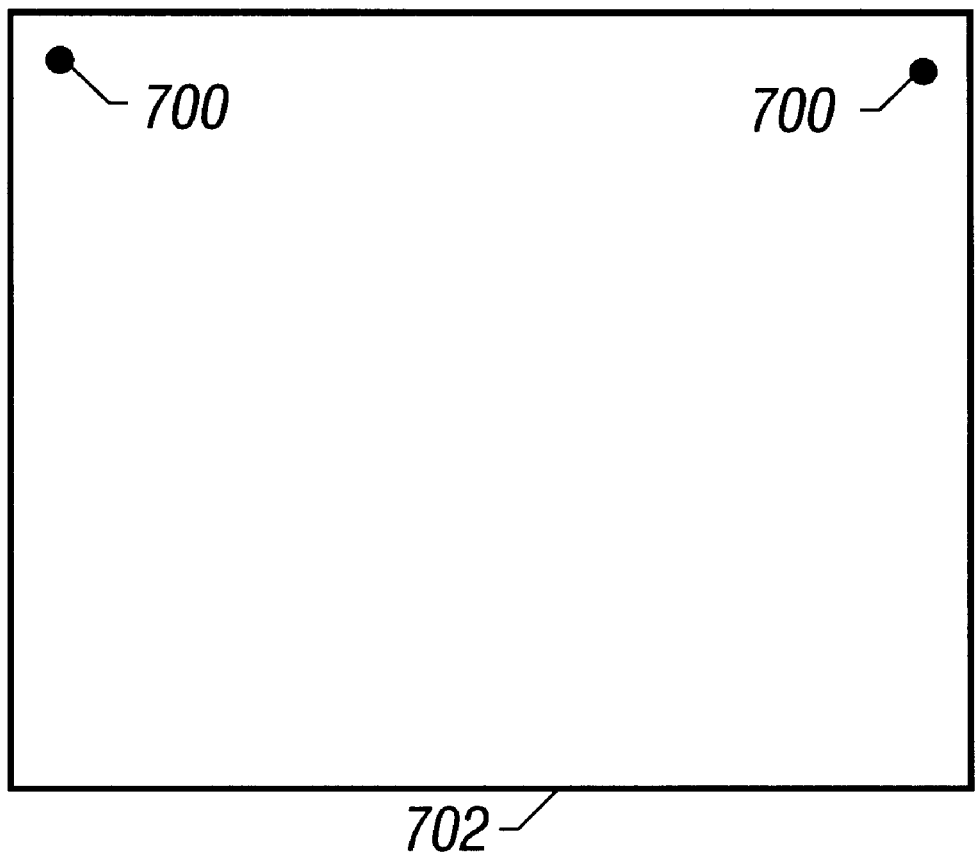
FIG. 7 shows the location of fixed sensors in accordance with an embodiment of the invention.

One embodiment of a pointer system, illustrated in FIG. 7, may include two (2) fixed sensors 700 attached to the top left and top right corners of a mouse pad 702. In this embodiment, the location of a mouse may be calculated correctly while a mouse is physically on the mouse pad 702. However, if a mouse is moved forward past fixed sensors 700, a mirror effect may occur with sensor signals resulting in an incorrect calculation of the movement of a mouse. This mirror effect may be eliminated in another embodiment, which may include three (3) fixed sensors attached to any three corners of a mouse pad. In this embodiment, the exact location and movement of a mouse may be calculated using triangulation techniques regardless of whether a mouse is on or off of the mouse pad. Still another embodiment may involve a mouse pad coupled with four (4) fixed sensors, each sensor being attached to a corner of a mouse pad. This embodiment may again allow exact determination of a mouse's location through, for example, triangulation as well as provide a fourth sensor for reliability in the event that one sensor fails.

Figure 8:
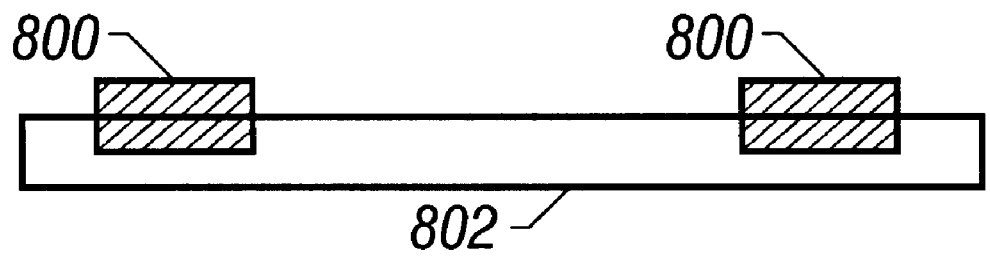
FIG. 8 shows how sensors may be attached to a mouse pad in accordance with an embodiment of the invention.

Sensors fixed to the corners of a mouse pad may be attached in at least three separate ways. One embodiment may include fixed sensors embedded in the corners of a mouse pad. Another embodiment may include fixed sensors attached completely above the surface of a mouse pad. A third embodiment, illustrated in FIG. 8, may include fixed sensors 800 attached such that fixed sensors 800 are slightly raised above the surface of mouse pad 802.

Referring again to FIGS. 1 and 6, a pointer system in accordance with the invention may receive power from a processing unit (e.g. via communication link 110). For example, mouse 606 may receive power from processor unit 102 via communication link 110. Alternatively, a pointer system in accordance with the invention may incorporate an internal power source such as a battery. In addition, a pointer system in accordance with the invention may provide pointer system button activation (e.g., mouse click) information in the same manner as conventional pointer systems.

Various changes in the materials, components, and circuit elements, are possible without departing from the scope of the claims. For instance, the illustrative computer system of FIG. 1, may include one or more programmable control devices. A programmable control device may be a single computer processor, a plurality of computer processors coupled by a communications link, a microcontroller, or a custom designed state machine. Custom designed state machines may be embodied in a hardware device such as a printed circuit board comprising discrete logic, integrated circuits, specially designed application specific integrated circuits (ASICs), or field programmable gate array devices.

While the invention has been disclosed with respect to a limited number of embodiments, numerous modifications and variations will be appreciated by those skilled in the art. It is intended, therefore, that the following claims cover all such modifications and variations that may fall within the true spirit and scope of the invention.

What is claimed is:

1. A pointer system comprising:
    a movement surface having a plurality of transmitting elements; and
    a mouse to slide over the movement surface, the mouse comprising a sensor operatively coupled to the transmitting elements to sense the signals transmitted by the transmitting elements to indicate a location of the mouse without requiring movement of the mouse over any of the transmitting elements.

2. The pointer system of claim 1, further comprising a computer system operatively coupled to the mouse.

3. The pointer system of claim 2, wherein the mouse is electro-optically coupled to the computer system.

4. The pointer system of claim 2, wherein the mouse is coupled to the computer system by an electromagnetic communication link.

5. The pointer system of claim 2, wherein the mouse further comprises a circuit to convert signals received from the transmitting elements to a location signal, the location signal indicating a location of the mouse relative to the movement surface.

6. The pointer system of claim 5, wherein the location signal comprises a delta-X indication and a delta-Y indication.

7. The pointer system of claim 5, wherein the location signal comprises an indication corresponding to a received signal from each of the transmitting elements.

8. The pointer system of claim 1, wherein the transmitting elements comprise a plurality of magnetic elements.

9. The pointer system of claim 1, wherein the transmitting elements comprise a plurality of ultrasonic elements.

10. The pointer system of claim 1, wherein the transmitting elements comprise a plurality of electrostatic elements.

11. The pointer system of claim 1, wherein the sensor is complementary to the transmitting elements.

12. A computer system, comprising:

a processing unit;

a movement surface, having a plurality of transmitting elements; and a mouse to slide over the movement surface, the mouse comprising a sensor operatively coupled to the plurality of transmitting elements to sense the signals transmitted by the transmitting elements to indicate a location of the mouse without requiring movement of the mouse over any of the transmitting elements.

13. The system of claim 12, wherein the processing unit comprises a pointer system driver routine, operatively coupled to the mouse.

14. The system of claim 12, wherein the mouse is electro-optically coupled to the processing unit.

15. The system of claim 12, wherein the mouse is coupled to the processing unit by an electromagnetic communication link.

16. The system of claim 12, wherein the transmitting elements comprise magnetic elements.

17. The system of claim 12, wherein the transmitting elements comprise ultrasonic elements.

18. The system of claim 12, wherein the transmitting elements comprise electrostatic elements.

19. The system of claim 12, wherein the sensor is complementary to the transmitting elements.

20. A computer system, comprising:

a processing unit;

a mouse operatively coupled to the processing unit and including a sensor element; and a movement surface over which the mouse slides, the movement surface comprising a plurality of transmitting elements, the transmitting elements operatively coupled to the sensor element included in the mouse to transmit signals to be sensed by the sensor element to indicate a location of the mouse without requiring movement of the mouse over any of the transmitting elements of the movement surface.

21. The system of claim 20, wherein the processing unit further comprises a pointer system driver routine operatively coupled to the mouse.

22. The system of claim 20, wherein the mouse is electro-optically coupled to the processing unit.

23. The system of claim 20, wherein the mouse is coupled to the processing unit by an electromagnetic communication link.

24. The system of claim 20, wherein each of the transmitting elements comprises a magnetic element.

25. The system of claim 20, wherein each of the transmitting elements composes an ultrasonic element.

26. The system of claim 20, wherein each of the transmitting elements comprises an electrostatic element.

27. The system of claim 20, wherein the mouse sensor is complementary to the plurality of transmitting elements of the movement surface.

28. The system of claim 20, wherein the mouse further comprises a circuit to convert signals received from the plurality of transmitting elements to a location signal, the location signal indicating a location of the mouse relative to the movement surface.

29. The system of claim 28, wherein the location signal comprises a delta-X indication and a delta-Y indication.

30. The system of claim 28, wherein the location signal comprises an indication corresponding to a received signal from each of the plurality of transmitting elements.

31. A pointer system comprising:

a movement surface having a plurality of sensors; and a mouse to slide over the movement surface, the mouse comprising a transmitting element operatively coupled to the plurality of sensors to transmit signals to the sensors to indicate a location of the mouse without requiring movement of the mouse over any of the sensors.

32. The pointer system of claim 31, further comprising a computer system operatively coupled to the movement surface.

33. The pointer system of claim 32, wherein the movement surface is electro-optically coupled to the computer system.

34. The pointer system of claim 32, wherein the movement surface is coupled to the computer system by an electromagnetic communication link.

35. A computer system, comprising:

a processing unit;

a movement surface, operatively coupled to the processing unit, having a plurality of sensors; and a mouse to slide over the movement surface, the mouse comprising a transmitting element operatively coupled to the sensors of the movement surface to transmit signals to the sensors to indicate a location of the mouse without requiring movement of the mouse over any of the sensors.

36. The system of claim 35, wherein the processing unit comprises a pointer system driver routine, operatively coupled to the movement surface.

37. The system of claim 35, wherein the movement surface is electro-optically coupled to the processing unit.

38. The system of claim 35, wherein the movement surface is coupled to the processing unit by an electromagnetic communication link.

39. A computer system, comprising:

a processing unit;

a mouse including a transmitting element; and a movement surface having a plurality of sensors, the sensors operatively coupled to the transmitting element included in the mouse to sense the signals transmitted by the transmitting element to indicate a location of the mouse without requiring movement of the mouse over any of the sensors.

40. The system of claim 39, wherein the processing unit further comprises a pointer system driver routine operatively coupled to the movement surface.

41. The system of claim 39, wherein the movement surface is electro-optically coupled to the processing unit.

42. The system of claim 39, wherein the movement surface is coupled to the processing unit by an electromagnetic communication link.

43. The system of claim 39, wherein each of the sensors comprises a magnetic sensor.

44. The system of claim 39, wherein each of the sensors comprises an ultrasonic sensor.

45. The system of claim 39, wherein each of the sensors comprises an electrostatic sensor.

* * * * *

UNITED STATES PATENT AND TRADEMARK OFFICE
CERTIFICATE OF CORRECTION

PATENT NO.    : 6,624,808 B1
DATED         : September 23, 2003
INVENTOR(S)   : Cris Andrews It is certified that error appears in the above-identified patent and that said Letters Patent is hereby corrected as shown below:

<u>Column 5,</u>
Line 67, "composes" should be -- comprises --.

Signed and Sealed this

Second Day of December, 2003

JAMES E. ROGAN
*Director of the United States Patent and Trademark Office*